April 25, 1950

H. L. WILLKE 2,505,747

TIGHT THREADED JOINT

Filed March 19, 1948

INVENTOR.
Herbert L. Willke
BY
C. Verne Martin
ATTORNEY

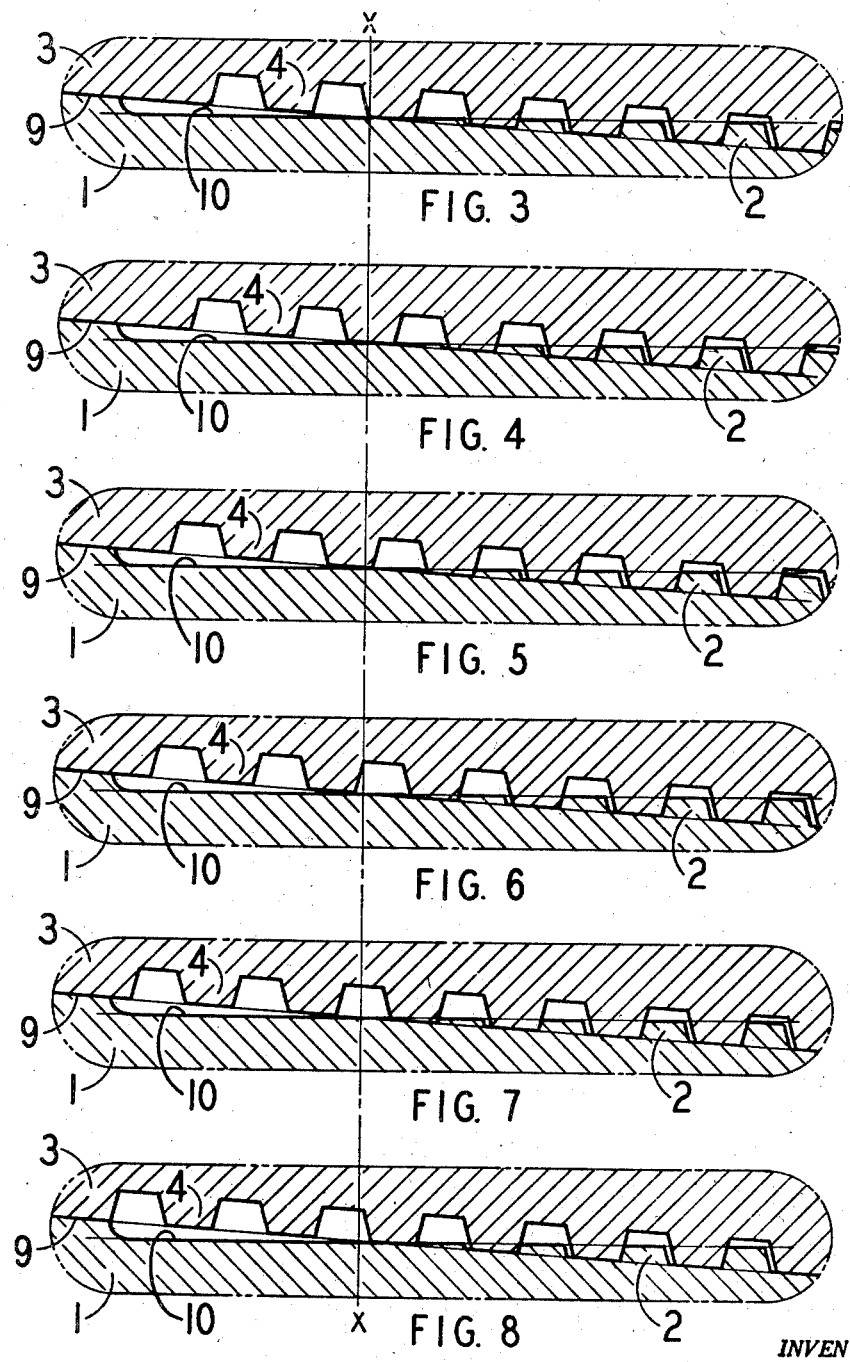

Patented Apr. 25, 1950

2,505,747

UNITED STATES PATENT OFFICE 2,505,747

TIGHT THREADED JOINT

Herbert L. Willke, Toledo, Ohio, assignor to The National Supply Company, Pittsburgh, Pa., a corporation of Pennsylvania Application March 19, 1948, Serial No. 15,772

2 Claims. (Cl. 285—146)

This invention relates generally to screw threaded joints and particularly the threaded joints for drill pipe used in drilling wells by the well known rotary method.

The drill pipe is made up of sections of tubing connected together by coupling members known as tool joints. Each complete tool joint comprises two members arranged to be coupled together co-axially by means of coarse inter-engaging box and pin threads which are readily assembled and taken apart as is done frequently during drilling operations. The outer ends of the joint members are provided with sleeve openings or sockets internally taper threaded for attachment to the abutting ends of adjacent pipe sections, which are also provided with tapered threads and sealing surfaces for cooperation with the threads and sealing surfaces in the joint member sockets.

The tapered sealing surfaces, co-extensive with the threads on the pipe ends, serve as an effective seal at the connection with the joint member to prevent leakage therethrough.

Although the engagement of sealing surfaces between the pipe and the end portion of the joint member contribute to the rigidity of the connection, the region of the thread run-out on the pipe persists in being the critical zone at which failure takes place due to the combined tensile and flexural stresses set up at the joint during drilling operations.

In the rotary drilling method mud laden fluid is forced into the well through the hollow drill pipe under very high hydraulic pressure for the purpose of washing out and carrying away the drill cuttings. In this method of operation the drill pipe is rotated in the well bore, which hole often deviates a few degrees from the vertical, producing a crooked well bore. This bore is somewhat larger in diameter than the outside diameter of the drill pipe, which frequently results in the bending of the drill pipe to a slight degree, thereby setting up flexural stresses therein. It has been found by experience that these flexural stresses are more or less concentrated at the last turn of the thread on the pipe at the large end of the taper.

Where such ordinary pipe threaded connections are provided with a sleeve end sealing surface the critical flexural stresses are concentrated at the last thread engagement between the male and female threads, which concentration is aggravated by a notch effect due to the form of normal thread construction. This point of last thread engagement becomes the fulcrum point at which the sleeve end sealing surface is cantilevered and about which this cantilevered surface may flexurally deviate from axial alignment of the joined members and in so doing set up dangerously critical stresses that sooner or later lead to joint failure.

The principal object of my invention is to provide a means for making a tight threaded connection between two axially aligned tubular members wherein the region of maximum critical stress resulting from making up the threaded joint is controlled, such that any additional aggravation due to a notch at this region is eliminated.

Another object is to provide a means for making a tight threaded connection between two axially aligned tubular members wherein a cylindrical or substantially cylindrical surface, whose axis is coincident with the axis of the joint, intersects the helical root cone of the male thread on a plane positioned to control the location of the run-out of the male thread.

Another object is to provide a means of making a tight threaded connection between two axially aligned tubular members wherein a cylindrical surface parallel to the axis of the joint extends on either side of a plane intersecting the helical root cone of the male thread at the run-out of the thread engagement between the two mating elements.

Another object is to control the region of the last thread contact between the mating elements, confining the tendency towards stress concentration at a plane which can be made free from any detrimental notch.

Another object is to control the position of the plane of intersection of the last thread contact between the mating elements and a cylindrical surface parallel to the axis of a pipe joint such that the cylindrical surface extends on both sides of said intersecting plane, resulting in a clearance space.

Another object is to eliminate any critical V-notch effect at the region where the large end of the thread root cone on the pipe end runs out on to a cylindrical surface intersecting the root cone and lying between the thread end and the co-extending sealing surface.

Another object is to provide a means for making a tight threaded joint between two tubular members, which will permit free engagement of the cooperating sealing surfaces at the large end of the tapered pipe threads as the joint is made up tight.

Another object is to provide a means for making a tight threaded joint between two tubular members, whereby the male threads on the pipe are permitted to pass through the outer sealing surface of the coupling as the joint is made up tight.

Other objects and advantages will be more fully apparent from the following description of the accompanying drawings which form a part of this disclosure and which illustrates the preferred form of embodiment of the invention.

Figure 2:
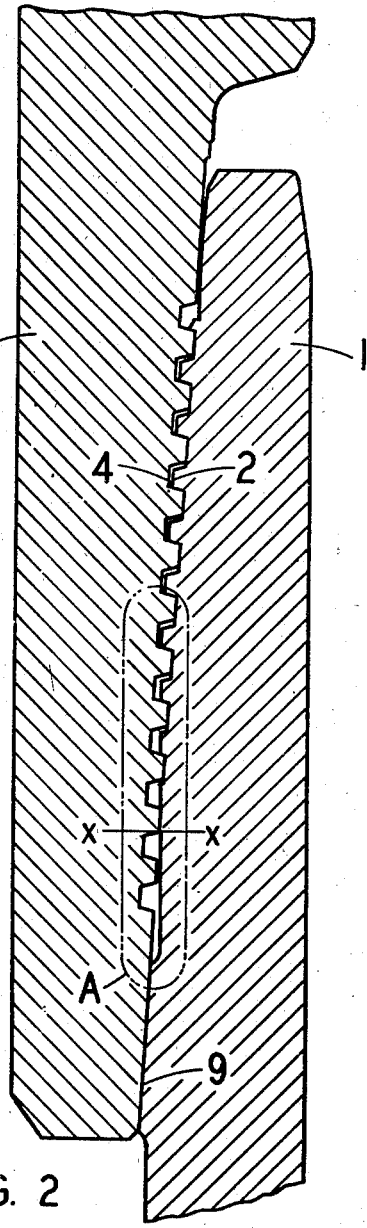
Fig. 2 is a sectional view of a portion of the pipe and tool joint enlarged to show the intimate relationship of the tapered joint when made up tight.

Figs. 3 to 8 inclusive are further enlarged sectional views of the fragment of Fig. 2 within the reference area marked A, showing my new and novel means for controlling the concentration of stresses at the last turn of the thread on the pipe at the large end of the taper joint. These six figures represent sections taken at 60 degree intervals about the circumference of the joint showing the uniform progressive advancement throughout one complete turn of the female thread of the box member upon the male thread of the pipe end. Figs. 3 to 8 inclusive further graphically show that the cylindrical or substantially cylindrical surface extends on both sides of the plane $x$—$x$ denoting the intersection of this surface with the root cone of the male thread and that a clearance space lying wholly within the root cone of the male threads results from this construction.

Referring to the drawings, the numeral 1 designates the drill pipe provided at its ends with an external tapered screw threaded zone 2. Disposed on the end of one of the drill pipes 1 is the box end 3 of a tool joint member having an internal tapered thread zone 4 that cooperates with the threads in the external threaded zone 2 of the drill pipe 1. The opposite end of the box end 3 of the tool joint member is provided with relatively coarse internal tapered threads 5 for engaging the mating external tapered threads 6 of the pin end 7 of the tool joint member. The opposite end of the pin end 7 is provided with the same internal tapered thread zone 2 of another drill pipe end. This completes the typical method of connecting two pieces of drill pipe by means of a tool joint for use in a well bore. Both the box and pin ends 3 and 7 respectively are provided with a bore 8 to permit the mud laden fluid to be pumped through the drill pipe.

Figure 1:
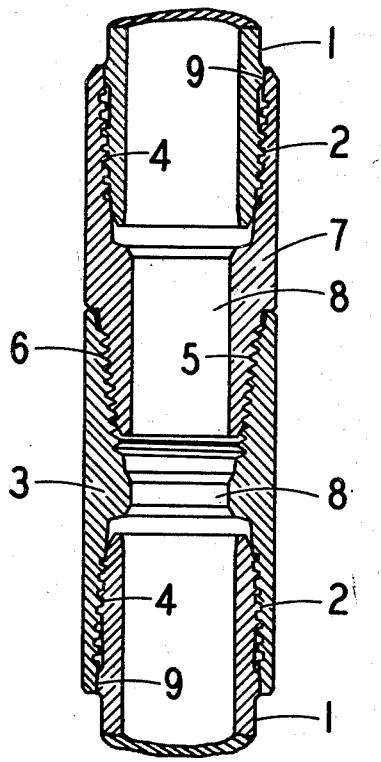
Fig. 1 is a longitudinal sectional view of a portion of two pieces of pipe co-axially coupled together by means of a tool joint.

In some instances the two pieces of drill pipe 1 are coupled together by means of an ordinary pipe coupling. The coupling may be described as comprising a hollow sleeve provided with an internally threaded zone at each end similar to that shown at 4 in Fig. 1 of the joint members 3 and 7 for engagement with the threaded zones 2 of the pipe 1.

The connection between the ends of the pipe 1 and the joint members (3 and 7) as used in the preferred form of my invention includes the provision of a modified form of acme screw threads cut on the thread zone 2 of the pipe 1 and in the joint members 3 and 7 at the thread zone 4 on a taper with the longitudinal axis of the pipe of approximately 1½″ per foot.

As previously stated in this specification the region of the thread run-out on the pipe is the critical zone at which the greatest concentration of stresses are set up and consequently the zone at which failure is most likely to occur. This is aggravated by the V-notch effect produced on the tapered surface due to the normal thread form construction. Mating frusto-conical sealing surfaces 9, co-extensive with the conical surface defining the root of the pipe threads, are spaced axially from the threads at the large diameter end of the thread cone.

I have found that by truncating or cutting off the crests of the male threads on a cylindrical or substantially cylindrical surface whose axis is coincident with the longitudinal axis of the pipe and which surface intersects the root cone of the male threads at the last run-out of the thread, and within the sealing surface 9, I am able to control the stress concentration by positioning the intersecting plane such that the aggravated effect of the V-notch is virtually eliminated. By allowing the cylindrical surface to extend on both sides of the intersecting plane $x$—$x$ (Figs. 3 to 8) a clearance space 10, extending into a portion of the sealing surface 9 and wholly within the root cone of the thread, is produced.

The mating elements 2 and 4 of the joint form an unyielding connection which provides an efficient seal at the sleeve end by restricting the flexural stresses that occur in the elements of the sealing surface 9. By truncating the threads on a cylindrical or substantially cylindrical surface whose axis is coincident with the axis of the pipe I am assured of full thread engagement between the crest of the internal thread zone 4 of the joint member and the root surface of the pipe thread zone 2 up to the run-out at its intersection with the cylindrical surface 10 and also of free engagement of the co-operating sealing surface 9 at the large end of the tapered threads when the joint is assembled and made up tight.

From the foregoing description and explanation of my invention, it is apparent that I have disclosed a new and novel means for making a tight threaded connection between two axially aligned tubular members which will reduce to a minimum the detrimental effects of flexural stresses usually set up at the large end of the tapered threads and have thus overcome this highly critical objection existing in ordinary pipe threaded connections.

Although I have shown and described only one practical embodiment of my invention, it will be understood that the invention is not to be limited to the specific construction or arrangement of parts shown, but that they may be widely modified within the scope of my invention as defined by the appended claims.

What I claim is:

1. In a tight threaded connection for a pair of axially aligned tubular members having complementary interengaging tapered thread zones, engagement between the threaded areas including contact at the crest of the female thread with the root of the male thread, the improvement comprising a substantially cylindrical surface on the male threaded member, said surface being at the large end of the thread zone and within the root cone of the male threaded member and intersecting said root cone under the last engaged thread of the female threaded member, whereby the area of thread engagement by the crest of the last mating thread of the female threaded member is reduced, and the effects of flexural stresses tending to break said members minimized.

2. In a tight threaded connection for a pair of axially aligned tubular members having complementary interengaging tapered thread zones, engagement between the threaded areas including contact at the crest of the female thread with the root of the male thread, the improvement comprising a substantially cylindrical surface on the male threaded member, said surface being at the large end of the thread zone and within the root cone of the male threaded member and intersecting said root cone under the last engaged thread of the female threaded member, a portion of said male threads adjacent said cylindrical surface being truncated by a continuation of said surface, whereby the area of thread engagement by the crest of the last mating thread of the female threaded member is reduced, and the effects of flexural stresses tending to break said members minimized.

HERBERT L. WILLKE.

REFERENCES CITED

The following references are of record in the file of this patent:

UNITED STATES PATENTS

| Number | Name | Date |
| --- | --- | --- |
| 1,927,657 | Eaton et al. | Sept. 19, 1933 |
| 1,932,427 | Stone | Oct. 31, 1933 |
| 2,183,644 | Frame | Dec. 19, 1939 |